United States Patent [19]

Harris, Jr. et al.

[11] Patent Number: 4,687,305
[45] Date of Patent: * Aug. 18, 1987

[54] MIRROR MOUNTING APPARATUS

[75] Inventors: Richard J. Harris, Jr.; Frank D. Pickens, both of Houston, Tex.

[73] Assignee: Spy-Mirrors, Inc., Deer Park, Tex.

[*] Notice: The portion of the term of this patent subsequent to Oct. 29, 2002 has been disclaimed.

[21] Appl. No.: 775,572

[22] Filed: Sep. 13, 1985

Related U.S. Application Data

[63] Continuation-in-part of Ser. No. 614,966, May 29, 1984, Pat. No. 4,549,790.

[51] Int. Cl.⁴ .......................... B60R 1/04; G02B 7/18
[52] U.S. Cl. .................................. 350/624; 248/479; 248/480; 350/623; 350/632
[58] Field of Search ............... 350/618, 623, 624, 631, 350/632; 248/476, 274, 477, 278, 495, 279, 496, 297.3

[56] References Cited

U.S. PATENT DOCUMENTS 3,704,063 11/1972 Guthrie ............................... 350/624
3,970,374 7/1976 Copp ................................... 350/632
4,549,790 10/1985 Harris, Jr. ........................... 350/624

Primary Examiner—John Petrakes
Attorney, Agent, or Firm—Pravel, Gambrell, Hewitt & Kimball

[57] ABSTRACT

The rear view system of the present invention allows a mirror to be mounted in the back of a bus which is effectively isolated from the vibration of the bus body thereby providing the driver a clear view of the passengers seated in the back of the bus even in buses having high back seats. The rear view system includes a mirror mounted to a backing support member. The backing support member is secured to the back of the bus using mounting brackets. A pair of matched mounting brackets is provided. Each bracket includes a lower strut fixedly mounted to the interior wall of the bus at one end and pivotally mounted to the backing support member adjacent the lower end of the mirror. An upper strut connected to the interior wall of the bus at a first end and connected to the backing support member adjacent the upper end of the mirror at a second end. The second end of the upper strut is adapted to translate with respect to the backing support member thereby allowing the mirror to pivot about the pivotal connection between the lower strut and the backing support member.

22 Claims, 6 Drawing Figures

MIRROR MOUNTING APPARATUS

This application is a contination-in-part of U.S. Application Serial No. 614,966 filed by Richard J. Harris on May 29, 1984 and now U.S. Pat. No. 4,549,790 entitled "MIRROR MOUNTING DEVICE" which entire application is incorporated by reference as if fully set forth herein.

FIELD OF THE INVENTION

This invention relates to rear view system to allow a driver to observe the occupants in the rear of a bus. The rear view system allows a mirror to be mounted to a bus interior wall, subject to vibration, without distorting the images viewed in the mirror by the driver.

BACKGROUND OF THE INVENTION

In the past, passenger buses, especially school buses, featured seats with relatively low backs which allowed the driver in the front of the bus to observe the occupants in every seat in the bus using a mirror mounted in the front of the bus. For safety reasons, newer busses and passenger vehicles now feature seats with raised seat backs so as to prevent neck injuries to occupants in the event of a collision. These new high-back seats, however, make it impossible for the driver to observe passengers seated toward the rear of the bus using an overhead mirror mounted over the windshield. It has been observed, especially in school buses, that when the occupants know the driver cannot observe their activities, vandalism such as destruction of the upholstery on the bus seats increases dramatically.

In the past, mirrors have been installed at the rear of the bus in an attempt to monitor occupant's activities and limit vandalism. Unfortunately, since the back of the bus is prone to substantial vibration forces transmitted from the engine and the suspension system, mirrors previously installed in the rear of buses have vibrated so much when the bus was in motion that the driver was unable to get a clear picture of the occupants seated in the rear. Accordingly, although the mirrors mounted in the bus may have been an initial psychological deterrent to vandalism, as soon as the occupants realized that the mirror mounted at the rear of the bus vibrated to such an extent as to prevent the driver from viewing their activities, the deterrent factor was lost. Accordingly, one of the objects of the invention is to provide a mounting system for a mirror to be mounted in the back of a bus which will significantly isolate the mirror from the vibrations of the bus body thereby allowing the driver a clear view of the occupants in the rear of the bus.

DESCRIPTION OF THE PRIOR ART

The most common way mirrors were supported in the prior art was to use a mounting system which had a pivoted connection on the center of a backing plate secured to a mirror. Typical of these mounting systems were U.S. Pat. Nos. 715,038; 419,549; 3,481,574; 3,392,950; 2,264,690; 3,533,681. Other mounting systems used in the prior art involved a frame around a mirror with a bracket attached to one end of the frame. Typical of these were U.S. Pat. No. 718,309; 1,571,097; 1,994,126. Still other designs involved a frame around a mirror with a through rod going through the frame parallel to the mirror surface. These designs were used for outside rear view mirrors and attached to a convenient point on the outer body of the vehicle adjacent the driver's seat. Typical of such mounting systems were U.S. Pat. No. 4,303,308; 3,408,136; 2,696,964 and 2,374,956. Other mounting systems allowed mirror adjustment via links that moved through slots wherein either the slots or the links were affixed to the mirror backing. Typical of such designs were U.S. Pat. Nos. 3,352,527; 1,748,691. A combination of mirrors including a windshield mirror and another mirror mounted outside the vehicle such as on an attached trailer was disclosed by U.S. Pat. No. 3,524,701. Finally, use of a rear view mirror mounted over a windshield to allow the driver to view the occupants in a vehicle was illustrated by U.S. Pat. No. 167,585.

SUMMARY OF THE INVENTION

The rear view system of the present invention allows a mirror to be mounted in the back of a bus which is effectively isolated from the vibration of the bus body thereby providing the driver a clear view of the passengers seated in the back of the bus even in buses having high back seats. The rear view system includes a mirror mounted to a backing support member. The backing support member is secured to the back of the bus using a pair of matched mounting brackets. Each bracket includes a lower strut fixedly mounted to the interior wall of the bus at one end and pivotally mounted to the backing support member adjacent the lower end of the mirror. Each bracket also includes an upper strut connected to the interior wall of the bus at a first end and connected to the backing support member adjacent the upper end of the mirror at a second end. The second end of the upper strut is adapted to translate with respect to the backing support member thereby allowing the mirror to pivot about the pivotal connection between the lower strut and the backing support member.

BRIEF DEDSCRIPTION OF THE DRAWINGS

DETAILED DESCRIPTION OF THE PREFERRED EMBODIMENT

Figure 1:
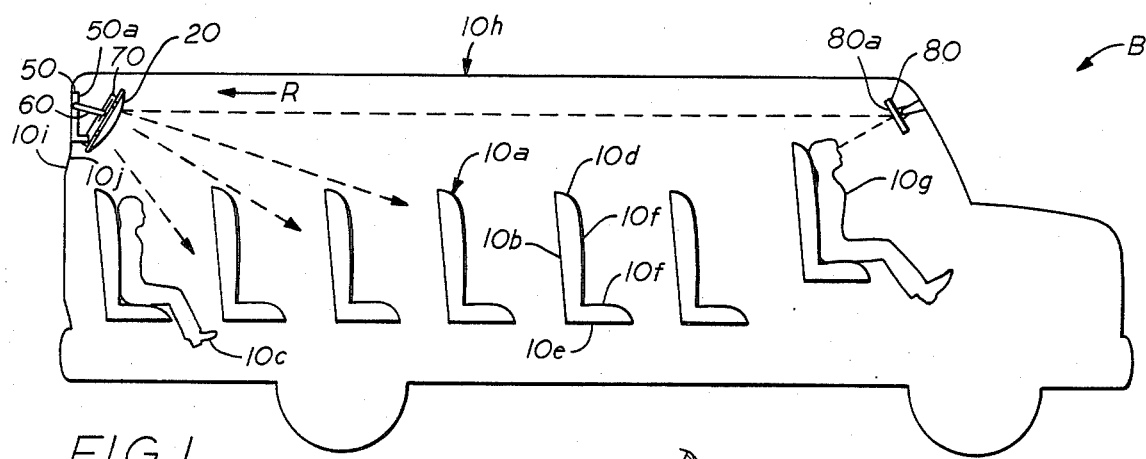
FIG. 1 is a sectional view of a bus equipped with a rear view system according to the present invention for viewing the occupants in the back of the bus.

As seen in FIG. 1 bus B has a plurality of seats 10a arranged one behind the other, typically in two rows (not shown) with an aisle in the middle (not shown). Seats 10a each have a high back portion 10b. High backs 10b on seats 10a are a recent phenomenon in bus construction and have primarily been employed in busses to reduce neck injuries to an occupant 10c.

Certain models of bus B have foam cushions 10d on the back 10b and the seating surface 10e. Cushion 10d is covered by a resilient material 10f which typically is a vinyl plastic.

The rear view system R of the present invention allows the bus driver 10g to have a clear view of the occupants 10c seated in the rear of the bus typically the last five rows of the bus B. The use of the rear view system R in bus B allows the driver 10g to observe occupants 10c to deter vandalism.

When the bus motor (not shown) is running the cantilevered rear end 10h of bus B is subject to significant vibration. The rear view system R of the present invention compensates for such vibration and thus provides the driver 10g an unblurred view of the occupants 10c in the rear of bus B.

Figure 2:
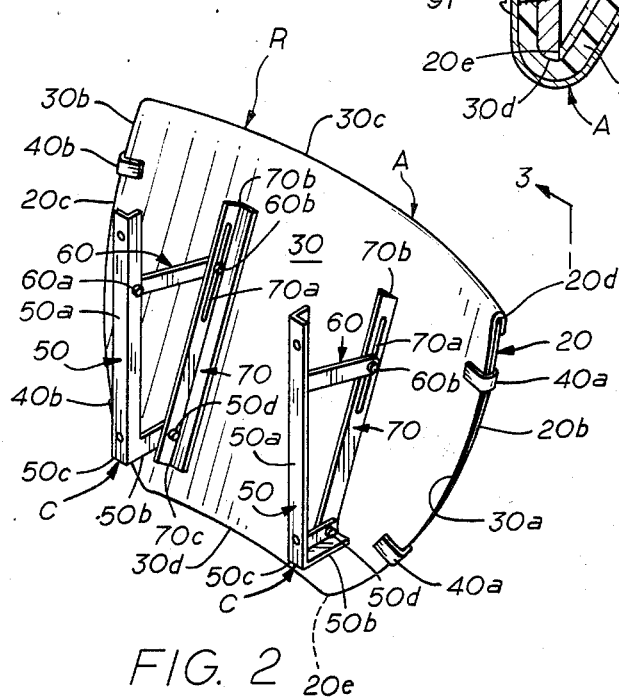
FIG. 2 is an isometric view illustrating the method of attachment of the mirror to the interior bus wall.

As best seen in FIG. 2, the rear view system R comprises a mirror 20, a backing support member 30, attachment means A, and mounting brackets C.

Figure 3:
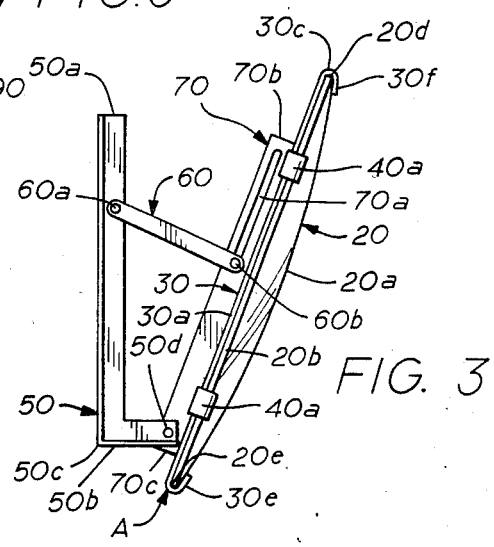
FIG. 3 is a side view taken along lines 3—3 of Fig. 2.

Mirror 20 has a convex reflective surface 20a (Fig. 3). Although a convex reflective surface is preferred, a flat reflective surface may be employed without departing from the spirit of the invention. Mirror 20 has a pair of opposing arcuate edges 20b and 20c. Mirror 20 also has a pair of opposing straight edges 20d and 20e (FIG. 3). Although edges 20d and 20e may actually be arcuate their projection onto backing support member 30 yields a straight line. The opposing straight edges 20d and 20e are aligned substantially parallel to the top of the rear exit door 10i (FIG. 1) of bus B. As seen in FIGS. 2 and 3, the perpendicular distance between opposing straight edges 20d and 20e is smaller than the perpendicular distance between arcuate edges 20b and 20c. As a result, the vertical height of mirror 20, as defined by the perpendicular distance between opposing straight edges 20d and 20e is kept to a minimum without impairing the ability of the driver 10g to observe the occupants 10c seated in the rear of the bus B. By example and not by way of limitation the perpendicular distance between opposing straight edges 20d and 20e measured along reflective surface 20a can be eighteen inches while the maximum distance between arcuate edges 20b and 20c measured along reflective suface 20a is twenty-four inches. A properly aligned mirror 20 having such dimensions and mounted in the rear of bus B will typically allow the driver 10g to observe the occupants 10c in the last five rows of seats 10a in bus B.

Figure 6:
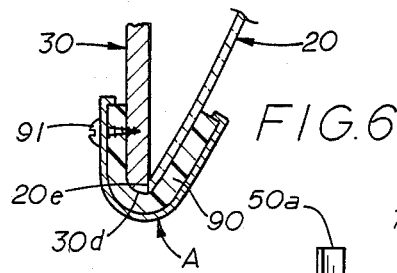

Referring to FIGS. 2 and 6, it can be seen that backing support member 30 conforms to the perimeter of mirror 20 in that edges 30a, 30b, 30c, and 30d are aligned with edges 20b, 20c, 20d, and 20e of mirror 20, respectively. Mirror 20 is secured to backing support member 30 by attachment means A.

Figure 4:
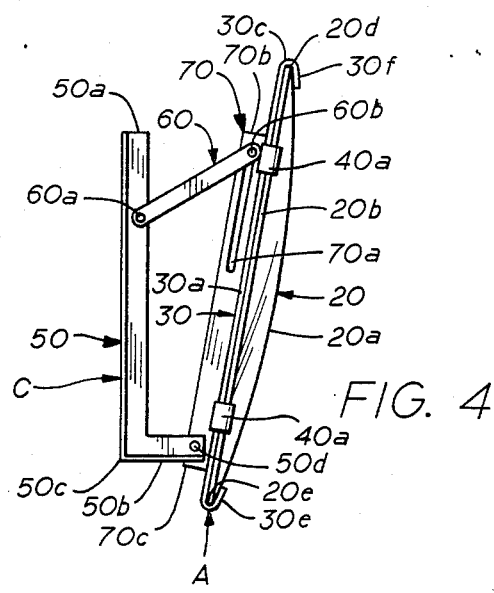
FIG. 4 is similar to the view shown in FIG. 3 with the upper strut in the opposite extreme position from Fig. 3.

Attachment means A can be of the type described in the previous application, which is incorporated herein as if fully set forth or as shown in FIGS. 2-4. As seen in FIGS. 2-4, attachment means A includes a plurality of clips 40a which are disposed along aligned edges 30a and 20b as well as 30b and 20c, thereby preventing lateral translation of the mirror 20 with respect to backing supporting member 30. Backing support member 30 is further formed having a lower hook-shaped segment 30e and an upper hook-shaped segment 30f, as shown in FIG. 3, in order to support mirror 20 and prevent vertical deflection of mirror 20 with respect to backing support member 30. Hook-shaped segments 30e and 30f are of sufficient rigidity to support mirror 20 against backing support member 30 yet retain sufficient resiliency to minimize excessive stresses on mirror 20 as a result of vibrations encountered at the rear end 10h of the bus B when the bus is underway. Similarly, clips 40a retain the aligned edges of mirror 20 to backing support member 30 while providing sufficient resiliency to reduce the possibility of localized overstressing to the mirror edges which could result in breakage of mirror 20 when the bus B is underway.

As seen in FIG. 6, in an alternative embodiment, attachment means A further comprises a resilient channel member formed preferably from sheet metal and preferably having an interior rubber component 90 adapted to receive the mirror 20 and the backing support member 30. The resilient channel member further includes preferably a sheet metal component overlying and substantially enclosing the rubber interior component.

As seen in FIGS. 2 through 4, mounting bracket C further includes lower strut 50 and upper strut 60. In the preferred embodiment, lower strut 50 has a first segment 50a which is disposed to be aligned adjacent the interior rear wall of the bus B as shown in FIG. 1. Lower strut 50 further includes a second segment 50b which extends from lower end 50c of first segment 50a. Second segment 50b is preferably integrally formed with first segment 50a and extends from segment 50a adjacent lower end 50c in a direction substantially perpendicular to the longitudinal axis of first segment 50a.

Backing support member 30 further includes a backing support member link 70 disposed and connected substantially parallel to the surface of the backing support member (FIGS. 2-4). Link 70 is formed having a slot 70a adjacent its upper end 70b. In the preferred embodiment, second segment 50b of lower strut 50 is integrally formed and extends from first segment 50a on one end and is pivotally connected via pin 50d to link 70 adjacent its lower end 70c. Additionally, upper strut 60 is pivotally connected to first segment 50a via pin 60a at one end. The opposite end of upper strut 60 is disposed to translate along link 70 via the extension of pin 60b through slot 70a thereby securing strut 60 to link 70 in a slidable relationship.

Figure 5:
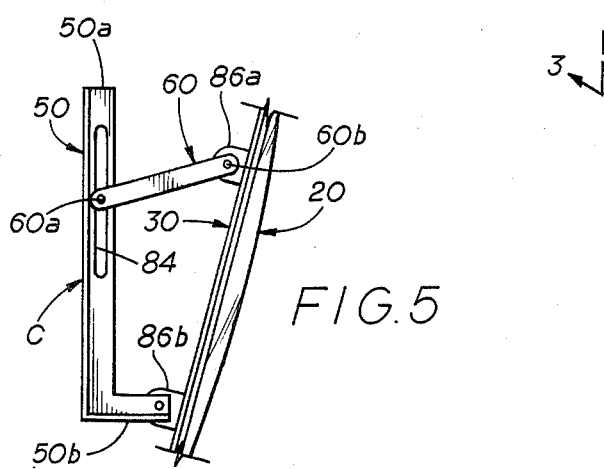
FIG. 5 is an alternative embodiment to the embodiment shown in Fig. 4.

In an alternative embodiment, the first segment 50a of lower strut 50 has a slot 84 mounted thereon. Upper strut 60 has one end pivotally connected to first segment 50a via pin 60a. The opposite end of upper strut 60 is pivotally connected through pin 60b to a support member mounting link which, in the embodiment of FIG. 5 is represented by mounting tabs 86a and 86b. Upper strut 60 is pivotally connected through pin 60b to tab 86a.

In the preferred embodiment, strut 60 is longer than second segment 50b thereby allowing mirror 20 to be adjusted in several positions as shown in FIGS. 2-4. It can readily be seen that by proper placement of slot 70a, the position of mirror 20 can be adjusted so that upper end 20d can be positioned an equal, greater or lesser distance from the interior rear wall 10j of the bus B than lower end 20e of mirror 20. Slot 70a can alternatively be placed on first segment 50a with strut 60 pivotally connected to link 70, thereby accomplishing the same adjustments as available in the embodiment shown in FIGS. 2 through 4. Alternatively, upper strut 60 can be pivotally mounted via pin 60a directly to the interior rear wall of the bus B thereby eliminating the use of first segment 50a of lower strut 50. Recognizing that transposition of certain elements is within the spirit of the invention, the embodiment illustrated in FIGS. 2 through 4 which provides better support for mirror 20 to resist the vibrations transmitted to the rear wall of bus B is preferred.

As shown in FIGS. 2-4, a matched pair of lower struts 50, upper struts 60 and links 70 are provided to connect the backing support member 30 to the rear wall 10d of the bus B. Links 70 extend parallel to each other with upper end 70b adjacent upper end 20d of mirror 20.

It should also be noted that the assembly of mounting brackets C is further strengthened by using L-shaped cross-sections for lower strut 50 as well as link 70.

When so disposed on backing support member 30, and in combination with attachment means A, mirror 20 can be mounted over a rear exit door 10i so that it is focused on occupants 10c seated in the rear 10h of bus B and is uneffected by vibrations in the structural frame of bus B. Mirror 20 is mounted over rear exit door 10i such that edges 20d and 20e are disposed in a parallel relationship to the top of exit door 10i. Frequently, the clearance above exit door 10i is minimal making it difficult to locate convex mirrors above the rear exit door 10i without having the mirror protrude into the door opening. To accommodate such space limitations, the mirror 20 of the present invention has a reduced dimension between edges 20d and 20e which allows the mirror 20 to fit above rear door 10i while at the same time, due to the larger dimension between edges 20b and 20c, still allow the driver unhindered view of the occupants 10c in the rear of bus B.

A second mirror 80 mounted over the driver's head at the front of the bus B can be positioned so that the driver may view the occupants 10c in the rear of bus B using mirror 20 without turning his head. Mirror 80 may have a flat or convex reflective surface 80a and can be mounted using mounting brackets C and D as described hereinabove.

The foregoing disclosure and description of the invention are illustrative and explanatory thereof, and various changes in the size, shape and materials, as well as in details of the illustrated construction may be made without departing from the spirit of the invention.

We claim:

1. A rear viewing system for allowing a driver to view occupants seated near the rear of a bus, the bus having interior walls subject to vibration as the bus moves, comprising:

a mirror having an upper and lower end;

a backing support member;

attachment means with said mirror and said backing support member for securing said mirror to said backing support member;

means for mounting said mirror to an interior wall of the bus further comprising:

a lower strut having a first and a second end, said first end being mounted to the interior wall of the bus and said second end being pivotally mounted to said backing support member, adjacent said lower end of said mirror;

an upper strut having a first end and a second end, said first end being pivotally connected to the interior wall of the bus, and said second end being connected to said backing support member adjacent said upper end of said mirror;

said second end of said upper strut being adapted to translate with respect to said backing support member, thereby allowing said mirror to be selectively pivoted about said pivotal connection between said lower strut and said backing support member.

2. The viewing system of claim 1 wherein:

said lower strut further includes a first and a second segment, said first segment having an upper and lower end, said first segment being adapted for mounting to the interior wall of the bus, substantially parallel thereto;

said second segment extending from the lower end of said first segment to a pivotal connection on said backing support member.

3. The viewing system of claim 2 wherein:

said first end of said upper strut is connected adjacent to said upper end of said first segment of said lower strut.

4. The viewing system of claim 3 wherein:

said first and second segments of said lower strut are disposed at substantially a right angle to each other.

5. The viewing system of claim 4 wherein:

said first and second segments of said lower strut are integrally formed.

6. The viewing system of claim 5 wherein:

said upper strut is longer than said second segment of said lower strut thereby allowing said upper end of said mirror to selectively be positioned an equal, greater and lesser distance from the wall of the bus than said lower end of said mirror.

7. The viewing system of claim 3 further comprising:

a backing support member mounting link, said link extending substantially parallel to said backing support member and connection thereto and wherein:

said link is formed having a longitudinal slot at one end;

said second end of said upper strut is disposed for slidable movement along said slot on said mounting link; and said second segment of said lower strut is pivotally connected to said mounting link at the end of said mounting link opposite from said slot.

8. The viewing system of claim 7 wherein:

said mirror has a convex reflecting surface.

9. The viewing system of claim 8 wherein said attachment means further comprises:

a resilient channel member formed having an elongated groove; and wherein said mirror and said backing support member have substantially the same peripheral dimensions and both said mirror and backing support member have an end extending into said groove.

10. The viewing system of claim 9 wherein said resilient channel member is formed from sheet metal.

11. The rear view system of claim 10 wherein:

said resilient channel member is formed having a rubber interior component adapted to receive said mirror and said backing support member and further comprises a sheet metal component overlying and substantially enclosing said rubber interior component.

12. The rear view system of claim 8 wherein:

said mirror and said backing support member have substantially the same peripheral dimensions; and said attachment means further comprises:

a plurality of clips holding the periphery of said mirror to the periphery of said backing support member.

13. The rear view system of claim 12 wherein said mirror and said backing support member are formed having a pair of opposing arcuate edges and a pair of opposing straight edges.

14. The rear view system of claim 13 wherein:

the distance between said opposing arcuate edges of said mirror is greater than the distance between said straight edges of said mirror.

15. The viewing system of claim 14 further comprising:
two backing support member mounting links mounted substantially parallel to each other on said backing support member; and
two identical sets of upper and lower strut members each connected to one of said mounting links;
said mounting links and strut members thereby securing said mirror to the inner wall of the bus when each of said first segments of said upper struts are attached to the interior wall.

16. The viewing system of claim 15:
a second mirror mounted in the front of the bus, near the driver and adapted to permit the driver to observe said mirror mounted in the rear of the bus without turning his head.

17. The viewing system of claim 16:
said first and second segments of said lower strut are disposed at substantially a right angle to each other.

18. The viewing system of claim 17:
said first and second segments of said lower strut are integrally formed.

19. The viewing system of claim 18 wherein:
said upper strut is longer than said second segment of said lower strut thereby allowing said upper end of said mirror to selectively by positioned an equal, greater and lesser distance from the wall of the bus than said lower end of said mirror.

20. a rear viewing system for allowing a driver to view occupants seated neat the rear of a bus, the bus having interior walls subject to vibration as the bus moves, comprising:
a mirror having an upper and lower end;
a backing support member;
attachment means with said mirror and said backing support member for securing said mirror to said backing support member;
means for mounting said mirror to an interior wall of the bus further comprising:
a lower strut having a first and second end, said first end being mounted to the interior wall of the bus and said second end being pivotally mounted to said backing support member, adjacent said lower end of said mirror;
an upper strut having a first end and a second end, said first end being slidably connected to the interior wall of the bus, and said second end being connected to said backing support member adjacent said upper end of said mirror;
said second end of said upper strut being adapted to pivot with respect to said backing support member, thereby allowing said mirror to be selectively pivoted about said pivotal connection between said lower strut and said backing support member;
said lower strut further includes a first and a second segment, said first segment having an upper and lower end, said first segment being adapted of mounting to the interior wall of the bus, substantially parallel thereto;
said second segment extending from the lower end of said first segment to a pivotal connection on said backing support member; and
said first end of said upper strut is connected adjacent to said upper end of said first segment of said lower strut.

21. The viewing system of claim 20 wherein:
said first segment of said lower strut is formed having a longitudinal slot thereon;
said first end of said upper strut is adapted for slidable movement along said slot;
said second end of said upper strut is pivotally mounted to said backing plate.

22. The viewing system of claim 20 further comprising:
a backing support member mounting link, said link extending substantially parallel to said backing support member and connected thereto and wherein:
said first segment of said lower strut is formed having a slot thereon, said first end of said upper strut is adapted for slidable movement along said slot;
said second end of said upper strut and said second segment of said lower strut both pivotally mounted to said mounting link on opposite ends thereof.

* * * * *